(12) United States Patent
Rasmussen

(10) Patent No.: US 11,673,602 B2
(45) Date of Patent: Jun. 13, 2023

(54) STEERING WHEEL ARRANGEMENT

(71) Applicant: Danfoss Power Solutions ApS, Nordborg (DK)

(72) Inventor: Søren Winkler Rasmussen, Sønderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 683 days.

(21) Appl. No.: 16/654,291

(22) Filed: Oct. 16, 2019

(65) Prior Publication Data
US 2020/0122770 A1  Apr. 23, 2020

(30) Foreign Application Priority Data

Oct. 18, 2018 (DE) .......................... 102018125868.2

(51) Int. Cl.
*B62D 5/04* (2006.01)
*B62D 5/00* (2006.01)

(52) U.S. Cl.
CPC ........... *B62D 5/0412* (2013.01); *B62D 5/006* (2013.01)

(58) Field of Classification Search
CPC .............................. B62D 5/0412; B62D 5/006
See application file for complete search history.

(56) References Cited

U.S. PATENT DOCUMENTS

| | | | | |
|---|---|---|---|---|
| 2,728,404 A * | 12/1955 | Peterson | ................... | B62D 5/06 91/375 R |
| 5,010,970 A * | 4/1991 | Yamamoto | ............... | B62D 6/10 192/55.61 |
| 6,053,270 A * | 4/2000 | Nishikawa | ............... | B62D 1/10 701/41 |
| 6,667,726 B1 * | 12/2003 | Damiani | ................ | B60K 37/02 701/1 |
| 8,002,075 B2 * | 8/2011 | Markfort | .................. | B62D 1/10 280/192 |
| 8,839,903 B2 * | 9/2014 | Markfort | .................. | B62D 1/10 180/443 |
| 10,144,383 B2 * | 12/2018 | Bodtker | ................ | B60R 21/203 |

(Continued)

FOREIGN PATENT DOCUMENTS

| | | |
|---|---|---|
| CN | 1771158 A1 | 5/2006 |
| CN | 101198508 A | 6/2008 |

(Continued)

OTHER PUBLICATIONS

Indian First Examination Report for Application No. 201914038554 dated Aug. 25, 2020.

*Primary Examiner* — Minnah L Seoh
*Assistant Examiner* — Ryan Edward Hardy
(74) *Attorney, Agent, or Firm* — McCormick, Paulding & Huber PLLC

(57) ABSTRACT

A steering wheel arrangement 1 is described comprising a steering wheel (2) having a rim (3) and a steering column 4 rotatably supported in the housing (5) and connected to the rim (3), wherein an electric machine (9, 13, 14) is operatively connected to the steering wheel (2). Such a steering wheel arrangement should be able to produce a force feedback to a traditional steering wheel in a reliable low-cost solution with a high functional safety rating. To this end electric machine (9, 13, 14) is integrated in the rim (3).

20 Claims, 1 Drawing Sheet

(56) References Cited

U.S. PATENT DOCUMENTS

| | | | | |
|---|---|---|---|---|
| 2003/0201975 A1* | 10/2003 | Bailey | ................... | G06F 3/016 |
| | | | | 345/161 |
| 2019/0002010 A1* | 1/2019 | Cao | ..................... | B62D 1/183 |
| 2020/0056416 A1* | 2/2020 | Kalb | ..................... | F16H 55/22 |

FOREIGN PATENT DOCUMENTS

| | | | | |
|---|---|---|---|---|
| CN | 101821149 A | | 9/2010 | |
| CN | 102470809 A | | 5/2012 | |
| CN | 105035152 A | | 11/2015 | |
| DE | 19604351 A1 | | 8/1997 | |
| DE | 10221241 A1 | | 11/2003 | |
| DE | 10315150 A1 | | 10/2004 | |
| DE | 102008036161 A1 | | 2/2010 | |
| EP | 1 613 521 B1 | | 11/2008 | |
| EP | 1 904 358 B1 | | 3/2012 | |
| JP | 2001160336 A | * | 6/2001 | |
| JP | 2013056581 A | | 3/2013 | |
| WO | WO-2009007571 A2 | * | 1/2009 | ............ B62D 5/005 |
| WO | WO-2009030497 A2 | * | 3/2009 | ............ B60K 35/00 |

\* cited by examiner

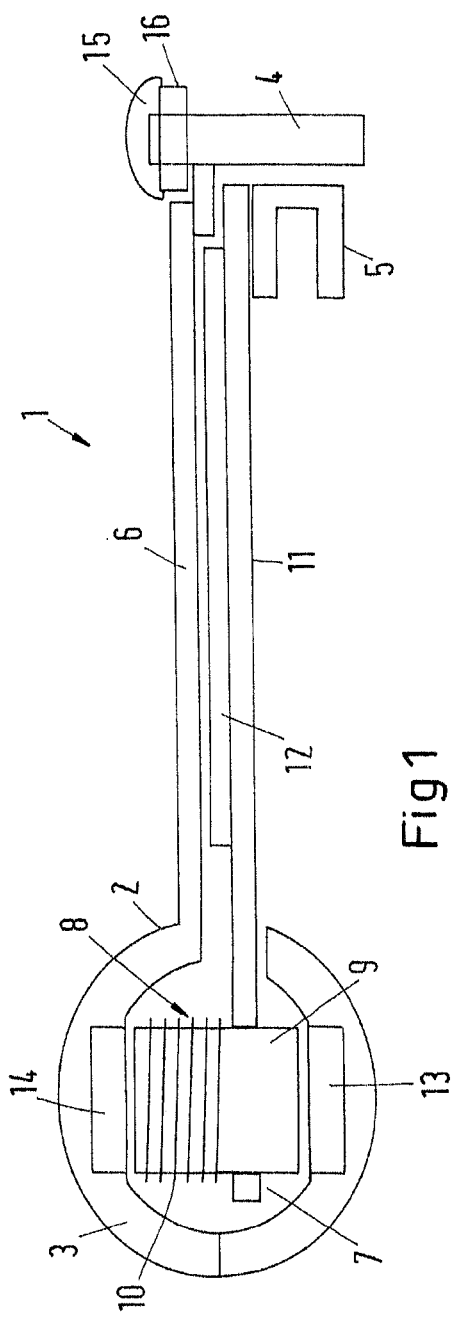
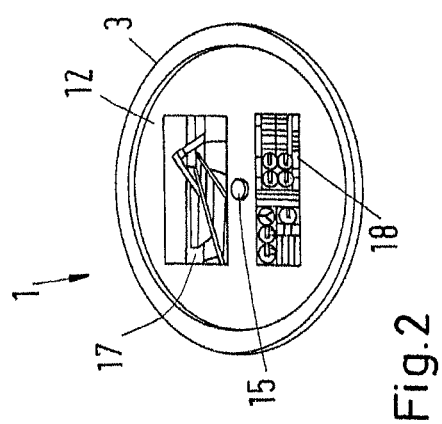

STEERING WHEEL ARRANGEMENT

CROSS-REFERENCE TO RELATED APPLICATION

This application claims foreign priority benefits under 35 U.S.C. § 119 to German Patent Application No. 102018125868.2 filed on Oct. 18, 2018, the content of which is hereby incorporated by reference in its entirety.

TECHNICAL FIELD

The present invention relates to a steering wheel arrangement comprising a steering wheel having a rim and a steering column rotatably supported in a housing and connected to the rim, wherein an electric machine is operatively connected to the steering wheel.

BACKGROUND

Such a steering wheel arrangement is known, for example, from DE 103 15 150 A1. The electric machine is in the form of a motor. A movement caused by the motor can be super-imposed to a movement caused by the driver of the vehicle in order to avoid a dangerous steering situation.

A further steering wheel arrangement of this kind is known from DE 102 21 241 A1. The machine is again in the form of a motor to produce a counter force against the torque produced by the driver of the vehicle.

In both cases the machine acts directly on the column. In order to produce sufficiently high torques or forces the machine must be rather bulky. Accordingly, it requires a certain space and it is almost impossible to retro fit such a machine in a conventional vehicle, for example a tractor, which was not constructed to be used with a steering wheel arrangement having an electric machine.

SUMMARY

The object-underlying the invention is to provide a steering wheel arrangement having an electric machine in a reliable low-cost solution.

This object is solved with a steering wheel arrangement as described at the outset in that the electric machine is integrated in the rim.

The rim is the part of the steering wheel arrangement having the largest distance from the axis of rotation of the column. Thus, the torque arm between the rim and the rotational axis is large as well. The machine can be operated with comparatively low forces at the radius of the rim and can nevertheless produce a high torque because of the large torque arm. The consequence is that the mounting space for the electric machine can be kept quite small. The steering wheel arrangement can replace a conventional steering wheel arrangement without the necessity of large constructional changes in the vehicle equipped with such a steering wheel arrangement. In this way it is possible to convert a mechanical vehicle easily to a GPS-steered vehicle in that the steering wheel can have all the ingredients which are needed for automatic steering integrated. All that is required is an exchange of the steering wheel and adding power supply to the steering wheel, for example, a tractor can easily be converted into an auto steering/guiding structure as the GPS-equipment could also be implemented on the steering wheel.

In a preferred embodiment the machine comprises a plurality of pole pairs. The machine cannot only be used as a motor, but also as an angle sensor. The larger the number of pole pairs is, the better is the resolution of the angle sensor.

In an embodiment of the invention the machine is in form of a pancake motor. A pancake is motor comparatively flat so that the rim can more or less keep a thickness which is known from conventional rims of steering wheels.

In an embodiment of the invention a joystick is arranged at a free end of the steering column. The joystick can be used to control a number of functions of the vehicle.

In an embodiment of the invention the machine comprises a stator and a rotor, wherein the stator is connected to the housing by means of a torque arm and the rotor is connected to the rim. The stator is directly or indirectly connected to the same element which supports the column. Accordingly, the stator is assigned to the axis of rotation of the column and thus to the axis of rotation of the rim of the steering wheel.

In an embodiment of the invention the rotor comprises a magnet arrangement and the stator comprises a coil arrangement. When the coils are excited in a controlled way, a force acting between the coil and the magnet arrangement is produced which in turn produces the torque on the rim. This torque can be used to rotate the steering wheel without an operation of the driver or it can be used to create a counter torque to the rotation produced by the driver. The coil arrangement comprises preferably a number of coils which are each wound around an iron core.

In an embodiment of the invention the magnet arrangement comprises for each pole of the machine a pair of magnets. The pairs of magnets are arranged on both sides of the coil arrangement.

In an embodiment of the invention the pair of magnets is oriented in a direction parallel to the axis of rotation of the column. In a corresponding way the coil arrangement comprises a number of coils, wherein the winding axis of the coils is likewise oriented in a direction parallel to the axis of rotation of the column.

In an embodiment of the invention the magnet arrangement comprises at least 36 pairs of magnets. This means that each pair of magnet covers 10° of the circumference of the rim. The 36 pairs of magnets form 36 pole pairs. The 36 pole pairs can be split in two groups of pole pairs to obtain a main function and a save function. This gives a full redundancy on angle or position detection and a half power redundancy on force feedback or driving force.

In an embodiment of the invention the torque arm is in form of a plate. The risk that the fingers of a driver are injured when they come in contact with a spoke or the like of the torque arm is minimized.

In an embodiment of the invention a display is arranged at the plate. The display can show information about operational parameters of the vehicle. It can, for example, replace the dashboard.

In an embodiment of the invention the rim is connected to the steering column by means of a transparent connecting means. Accordingly, the display can fully be viewed in all rotational orientations of the steering wheel.

In an embodiment of the invention the joystick forms control means for the display. The joystick can be, for example, pressed, tilted and rotated. The tilting of the joystick can be used, for example, to move a cursor or another pointing element to certain areas of the display and pressing of the joystick can be used to select a function indicated by an area of the display. Rotation of the joystick can be used to change value contents of fields displayed in the display.

In an embodiment of the invention the rim has a diameter of at least 40 cm. In this case a radius of 20 cm is available as a torque arm which is quite large.

BRIEF DESCRIPTION OF DRAWINGS

A preferred embodiment of the invention will now be explained with more detail with reference to the drawing, in which:

FIG. 1 shows a sectional view through a part of a steering wheel arrangement and FIG. 2 shows a perspective view of the upper side of the steering wheel.

DETAILED DESCRIPTION

A steering wheel arrangement 1 comprises a steering wheel 2 having a rim 3. Furthermore, the steering wheel arrangement 1 comprises a steering column 4 which is rotatably supported in a housing 5 and connected to the rim 3. The connection between the rim 3 and the steering column 4 is in form of a transparent plate 6 which forms transparent connecting means.

The rim 3 is of circular form. It is hollow, i. e. it encloses a cavity 7.

A coil arrangement 8 is arranged in the cavity 7. The coil arrangement 8 comprises a number of iron cores 9 which are distributed evenly in circumferential direction of the rim 3. Furthermore, the coil arrangement 8 comprises for each core 9 a coil 10 which is wound around the iron core 9. The coil arrangement 8 is part of a stator.

The stator is connected to the housing 5 by means of a torque arm 11. The torque arm 11 is in form of a torque plate which can bear a printed circuit board (not shown). A display 12 is mounted on the torque arm 11. Since the plate 6 connecting the rim 3 and the steering column 4 is transparent, the driver of the vehicle can see the display 12 in all angular orientations of the steering wheel 2.

A pair of magnets 13, 14 is arranged in the rim 3. Preferably the magnets 13, 14 of the pair of magnets are arranged as close as possible to the cavity 7 and consequently as close as possible to the coil arrangement 8. The number of pairs of magnets 13, 14 corresponds to the number of iron cores 9 and coils 10.

The orientation of the arrangement of magnets 13, 14 can be changed. It is, for example, possible to use only a single set of magnets 14 on the radial outside of the rim 3 and to orient the core 9 and the coil 10 in radial direction as well.

In this way the elements 8, 13, 14 form an electric machine in form of a pancake BLDC motor. It is possible to use another kind of motor type, for example, a PMSM-motor (Permanentmagnet synchronous motor). The motor 9, 13, 14 can be used for several purposes. It can be used, for example, as position sensor feeding back an angular position of the rim 3 with respect to a neutral position. Furthermore, it can be used to produce an active force feedback, i. e. it can be used to produce a force acting against a force or torque produced by a driver steering a vehicle equipped with the steering wheel arrangement 1. Finally, the motor 9, 13, 14 can be used to steer the vehicle automatically, for example, in connection with a global positioning system (GPS).

The number of pairs of magnets 13, 14 and of iron cores 9 should be as large as possible, when, for example, 36 iron cores 9 and a corresponding number of pairs of magnets 13, 14 are used, 36 pole pairs are available. These 36 pole pairs can be split in two groups so that there is a full redundancy detection of the angular position of the steering wheel 2 and half power redundancy on force feedback.

A joystick 15 which is only shown schematically, is located on top of the steering column 4, for example, above a nut 16.

The display 12 can have a first display field 17 showing information and a second display field 18 showing a number of actuation areas. By tilting the joystick 15 in different directions a cursor or any other pointing symbol can be moved to the actuation areas, while pressing the joystick 15 causes a selection of the corresponding actuation area. Rotation of the joystick 15 can then be used to change a value of the corresponding actuation area. Other ways of using the joystick 15 are possible.

The use of the printed circuit board directly in the steering wheel arrangement if of advantage because the steering wheel arrangement can have all the ingredients which are needed for automatic steering. The printed circuit board can be connected, for example, to a CAN-bus or another bus system integrated in the vehicle.

The rim 3 has preferably a diameter of at least 40 cm. In this way the torque arm between the rim 3 and the axis of rotation of the steering column 4 is at least 20 cm so that a large torque can be produced even when the coil arrangement 8 together with the magnet arrangement produces only low forces.

The steering wheel arrangement 1 can be retrofitted to any vehicle with a traditional steering wheel. It provides a low-cost solution with high performance and functional safety.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A steering wheel arrangement comprising a steering wheel having a rim and a steering column rotatably supported in a housing and connected to the rim, wherein an electric machine is operatively connected to the steering wheel for providing power steering torque, wherein the electric machine is integrated in the rim.

2. The steering wheel arrangement according to claim 1, wherein the machine comprises a plurality of pole pairs.

3. The steering wheel arrangement according to claim 1, wherein the machine is in the form of a pancake motor.

4. The steering wheel arrangement according to claim 1, wherein a joystick is arranged at a free end of the steering column.

5. The steering wheel arrangement according claim 1, wherein the machine comprises a stator and a rotor, wherein the stator is connected to the housing by means of a torque arm and the rotor is connected to the rim.

6. The steering wheel arrangement according to claim 5, wherein the rotor comprises a magnet arrangement and the stator comprises a coil arrangement.

7. The steering wheel arrangement according to claim 6, wherein the magnet arrangement comprises for each pole of the machine a pair of magnets.

8. The steering wheel arrangement according to claim 7, wherein the pair of magnets is oriented in a direction parallel to an axis of rotation of the steering column.

9. The steering wheel arrangement according to claim 7, wherein the magnet arrangement comprises at least 36 pairs of magnets.

10. The steering wheel arrangement according to claim 5, wherein the torque arm is in the form of a plate.

11. The steering wheel arrangement according to claim 10, wherein a display is arranged at the plate.

12. The steering wheel arrangement according to claim 11, wherein the rim is connected to the steering column by means of a transparent connecting means.

13. The steering wheel arrangement according to claim 11, wherein a joystick forms control means for the display.

14. The steering wheel arrangement according to claim 1, wherein the rim has a diameter of at least 40 cm.

15. The steering wheel arrangement according to claim 2, wherein the machine is in the form of a pancake motor.

16. The steering wheel arrangement according to claim 2, wherein a joystick is arranged at a free end of the steering column.

17. The steering wheel arrangement according to claim 3, wherein a joystick is arranged at a free end of the steering column.

18. The steering wheel arrangement according to claim 2, wherein the machine comprises a stator and a rotor, wherein the stator is connected to the housing by means of a torque arm and the rotor is connected to the rim.

19. The steering wheel arrangement according to claim 3, wherein the machine comprises a stator and a rotor, wherein the stator is connected to the housing by means of a torque arm and the rotor is connected to the rim.

20. The steering wheel arrangement according to claim 4, wherein the machine comprises a stator and a rotor, wherein the stator is connected to the housing by means of a torque arm and the rotor is connected to the rim.

\* \* \* \* \*